Patented Apr. 11, 1939

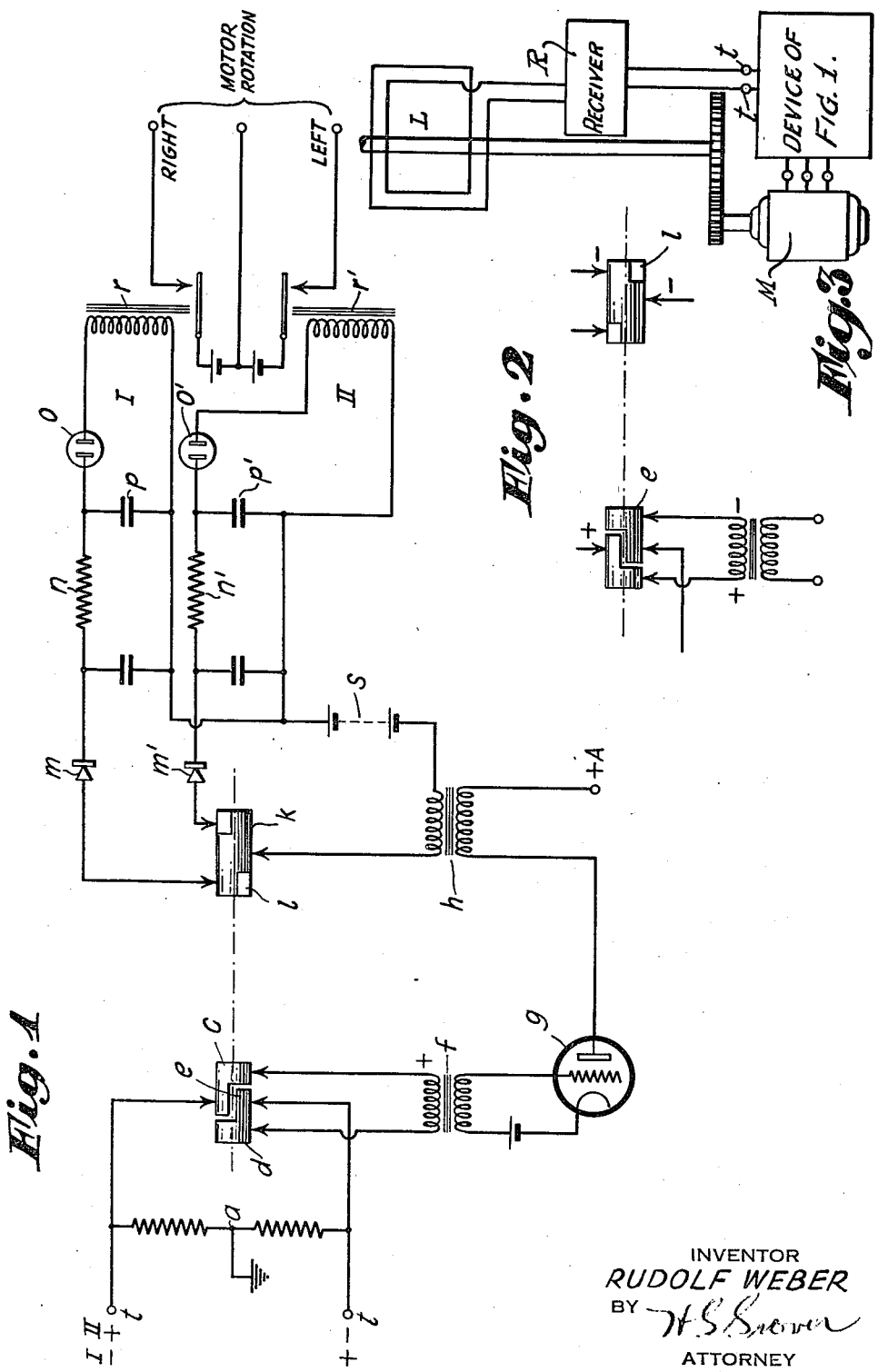

2,153,782

UNITED STATES PATENT OFFICE

2,153,782

AUTOMATIC ADJUSTING MEANS FOR ROTARY SYSTEMS, PARTICULARLY DIRECTION-FINDERS

Rudolf Weber, Leipzig, Germany, assignor to Telefunken Gesellschaft für Drahtlose Telegraphie m. b. H., Berlin, Germany, a corporation of Germany Application November 26, 1937, Serial No. 176,551
In Germany September 9, 1936

5 Claims.  (Cl. 250—11)

Various methods are known for determining the direction of radiation of electromagnetic waves in which a frame or loop antenna is caused automatically to adjust itself to minimum signal strength of incoming waves to which the receiver apparatus is tuned, the mechanism being caused to stay in this position as long as the sense of incidence of the waves is not altered. In case of a change of direction of the beam from which bearings are to be taken in relation to the loop antenna, the loop is made to automatically rotate through a similar angle. Direction-finding receivers are also known in which the radio frequency signal of a directional system is modulated with an audio frequency and there is superposed thereon a similar signal from a non-directional antenna, in such a way that the audio frequency which may be filtered out therefrom is affected by the phase lead or change of the radio frequency. In that case a phase responsive arrangement is used which, through a critically adjusted differential relay and associated retarding or time-lag relay so actuates and controls a bilaterally operating loop revolving mechanism that the blade or armature of the differential relay, in the presence of loop energy and depending upon its phase, will be positioned on the contact which will convey the loop to the minimum signal position through the shortest possible way.

However, all of these methods known in the earlier art involve serious drawbacks. Arrangements, heretofore known, which operate with mechanically acting zero-adjustment of the loop through the agency of relays and an electric motor are liable to errors of direction-finding as a result of the action of stray impulses or atmospherics which may cause undesirable and inadvertent response in the relay circuits. Moreover, circuit organizations predicated for their operation upon electric motors involve the shortcoming that the motor up to the minimum-signal strength position in which the loop should slope, is running at full speed. On the other hand, it would be unfavorable or unsatisfactory if an attempt were made to cause the potential impressed upon the receiving loop to act in some way upon the motor power supply with a view to insuring a rate of rotation proportional to the amplitude of the received signal, for in that case the starting torque of the motor would then be too low, in positions of the loop which are close to the minimum or zero.

However, since nevertheless a speed regulation proportional to the loop potential is desirable, this problem according to the present invention is solved by the aid of a relaxation oscillator operating with glow-tubes or neon lamps. The scheme is based upon the use of a potential prevailing at the output circuit of a target-bearing receiver which, according to the position of the directional antenna is positive or negative. This D. C. potential of a few millivolts, according to this invention, is converted into alternating potential by means of a mechanical converter, and then amplified in a standard type of tube. The plate alternating voltage of this circuit is then applied to a switch mounted upon the same shaft as the first converter. From the said switch certain current impulses are fed through rectifiers to one of the two ratchet or relaxation-wave devices utilizing glow-tubes or neon tubes. Since the glow-discharge paths are subject to a D. C. biasing potential, a slight additional potential suffices to cause striking or glowing of the tube and response of the relay. In a way as known in the art, a motor coupled with the loop setting mechanism will then be switched in so as to rotate in one direction or the other.

According to this invention, alternating current amplification may be used for the voltage obtained from the receiver. This is intentionally done in order to obviate the drawbacks such as restricted amplifying ability and unstability which accompany ordinary direct current amplification.

The basic principle of the new method is shown in Fig. 1. Figure 2 illustrates a portion of the device of Fig. 1 in a different operating position. Figure 3 illustrates diagrammatically the application of my invention to a target bearing receiver.

The output potential of a target-bearing receiver outfit brought by means of terminals $t$, $t$ to a resistance arrangement $a$ is applied to the two insulated segments $c$ and $d$ of a mechanical converter $e$. If the directional antenna receives a signal so that at segment $c$ of the converter $e$ there is positive potential, then, after transformation in transformer $f$, amplification in tube $g$, and separation of the plate voltage from the alternating current component by transformer $h$, at the instant indicated in the figure, a positive potential will also prevail in the segment $k$ of the switch $l$. Through a second contact on segment $k$, a current flows through rectifier $m$ and resistance $n$ to charge condenser $p$ which is connected in parallel relation to the glow-tube $o$ and relay $r$ and forming relaxation oscillator I. The switch device $l$ comprises a member $k$ and two conducting segments insulated therefrom and displaced in reference to each other an angle of 180 degrees.

If the two switches $e$ and $l$ seated upon the shaft have been turned an angle of 180 degrees as schematically indicated in Fig. 2, then the negative potential from the transformer will act at the tap which leads to oscillator II. This negative impulse of current, however, is blocked by the rectifier $m'$. A further rotation of the switches through an angle of 180 degrees again restores conditions as first stated during which time the oscillator condenser $p$ becomes further charged. As a function of the amplitude of the direct voltage acting at the output of the receiver, the glow-discharge path which is already biased by a potential furnished from the battery $s$ must be fed with a definite number of charging current impulses in order to be ignited and to start the motor immediately at full speed by virtue of the energization of the relay. While the ignition or flashing time and thus the length of connection are a function of the size of the condenser $p$, it will be noted that the striking and thus the switch frequency, at a constant capacity $p$, is solely a function of the size of the potential acting at the direction-finder antenna. If the input potential is very high, the switch frequency will be so great that the relay $r$ will no longer drop off.

Fundamentally speaking, the rectifiers $m$ and $m'$ are not essential since a current impulse of wrong phase would be opposite in relation to the battery $s$, while only an impulse in the proper phase would be in series with the battery $s$ to thus cause the discharge-path to flash. In the present instance, the rectifiers $m$ and $m'$ serve solely to prevent the discharging of the condensers $p$ and $p'$ through the switch $l$.

The operation of the new method here disclosed by means of which is obtained a speed of minimum-signal strength adjustment of the direction-finder system which is a function of the amplitude of the input potential, with the potential acting at the motor always at its full value, has been described in a case where the directional system is on one side of the minimum position. If the directional system is located on the opposite side, the same general considerations hold true. However, the inverse sign of the input potential has the result that the impulses will now cause oscillator II to respond, with the consequence that the direction of rotation of the motor is reversed.

The same arrangement may similarly be applied to the control mechanism of craft on which a directional antenna in fixed position relative to the craft is in the minimum or zero position when on course or in the direction of travel. A deviation out of and away from the course would in this case induce a potential in the directional antenna which, through the intermediary of an arrangement as here disclosed, acts upon the control means of the craft until the original course has been resumed for which the directional or direction-finder antenna is in the minimum signal-strength position. Of course, in this case also a directional radiation or beam with a marked minimum may be used which is picked up by a non-directional receiver.

The two revolving switches fitted upon the same shaft, if desired, may be arranged on the same motor which through a reversing gear causes the setting of the direction-finding system. In Figure 3 is shown the application of my invention to a target bearing receiver R. The receiver is connected to a loop L which may be rotated by motor M. The direction and the degree of rotation of the motor M is controlled by my invention which is shown in more detail in Figure 1.

I claim:

1. A control device including a rotatable shaft and a motor for rotating said shaft, means responsive to the angular deviation of said shaft from a predetermined position for deriving a potential, the polarity of which is dependent upon the direction of deviation and the magnitude of which is dependent upon the angle of said deviation, means responsive to said potential for generating impulses, the polarity of said impulses being dependent upon the polarity of said potential and the frequency of said impulses being proportional to the magnitude of said potential and means for applying said impulses to said motor whereby said shaft is rotated to its predetermined position.

2. A control device including a rotatable shaft and a motor for rotating said shaft, means responsive to the angular deviation of said shaft from a predetermined position for deriving a potential, the polarity of which is dependent upon the direction of deviation and the magnitude of which is dependent upon the angle of said deviation, means responsive to said potential for generating impulses of constant magnitude, the polarity of said impulses being dependent upon the polarity of said potential and the frequency of said impulses being proportional to the magnitude of said potential and means for applying said impulses to said motor whereby the said shaft is rotated to its predetermined position.

3. A direction-finding receiver including a rotatable loop antenna and a motor for rotating said antenna, a receiver connected to said loop and responsive to signals picked up by said loop, said receiver generating a potential from said signal which has a polarity dependent upon the angular deviation of said antenna from the direction of propagation of said signals and the magnitude of said potential being dependent upon the amount of said deviation, means responsive to said potential for generating impulses of constant magnitude, the polarity of said impulses being dependent upon the polarity of said potential and the frequency of said impulses being proportional to the magnitude of said potential, and means for applying said impulses to said motor whereby said antenna is rotated to a predetermined relationship with the direction of propagation of said signals.

4. A direction-finding receiver including a rotatable loop antenna and a motor for rotating said antenna, a receiver connected to said loop and responsive to signals picked up by said loop, said receiver generating a potential from said signal which has a polarity dependent upon the angular deviation of said antenna from the direction of propagation of said signals, the magnitude of said potential being dependent upon the amount of said deviation, a pair of relays selectively operable to control the direction of rotation of said motor, means responsive to said potential for generating impulses for operating one of said relays dependent upon the polarity of said potential and means for varying the frequency of said impulses with the amplitude of said potential.

5. A direction-finding receiver including a rotatable loop antenna and a motor for rotating said antenna, a receiver connected to said loop and responsive to signals picked up by said loop, said receiver generating a potential from said signal which has a polarity dependent upon the angular deviation of said antenna from the direction of propagation of said signal, the magnitude of said potential being dependent upon the amount of said deviation, a pair of relays selectively operable in accordance with the polarity of said potential to control the direction of rotation of said motor and a relaxation oscillator connected between each of said relays and said receiver for generating impulses of constant amplitude, the frequency of said impulses being proportional to the amplitude of said potential.

RUDOLF WEBER.